US010876035B2

(12) United States Patent
Pradhan et al.

(10) Patent No.: US 10,876,035 B2
(45) Date of Patent: Dec. 29, 2020

(54) METHOD FOR DECOMPOSING ASPHALTENE USING A SUPPORTED CATALYST

(71) Applicants: Baker Hughes, a GE company, LLC, Houston, TX (US); Williams Marsh Rice University, Houston, TX (US)

(72) Inventors: Sivaram Pradhan, Houston, TX (US); Scott Wellington, Bellaire, TX (US); Houman Shammai, Houston, TX (US); Michael Wong, Houston, TX (US)

(73) Assignees: Baker Hughes, a GE company, LLC, Houston, TX (US); William Marsh Rice University, Houston, TX (US)

( * ) Notice: Subject to any disclaimer, the term of this patent is extended or adjusted under 35 U.S.C. 154(b) by 374 days.

(21) Appl. No.: 15/173,476

(22) Filed: Jun. 3, 2016

(65) Prior Publication Data

US 2017/0349808 A1 Dec. 7, 2017

(51) Int. Cl.
   *E21B 43/22* (2006.01)
   *C09K 8/524* (2006.01)
   *E21B 43/24* (2006.01)
   *E21B 43/16* (2006.01)

(52) U.S. Cl.
   CPC .............. *C09K 8/524* (2013.01); *E21B 43/24* (2013.01); *E21B 43/16* (2013.01)

(58) Field of Classification Search
   CPC .......... C10G 65/04; E21B 43/16; E21B 43/24
   See application file for complete search history.

(56) References Cited

U.S. PATENT DOCUMENTS

| 2010/0230323 | A1* | 9/2010 | Ancheyta Juarez ... C10G 65/04 208/59 |
| 2012/0205285 | A1* | 8/2012 | Dindi ..................... C10G 45/08 208/49 |
| 2013/0220883 | A1 | 8/2013 | Mazyar et al. |
| 2014/0225607 | A1 | 8/2014 | Edwards et al. |
| 2015/0219614 | A1 | 8/2015 | Respini et al. |
| 2016/0318764 | A1* | 11/2016 | Raman ..................... C01B 3/26 |

OTHER PUBLICATIONS

Abdallah, et al., "Raman spectrum of asphaltene", Energy Fuels, 2012, 26 (11) 6888-6896.
Abdallah, et al., "Study of Asphaltenes Adsorption on Metallic Surface Using XPS and TOF-SIMS", J. Phys. Chem. C 2008,112 (48) 18963-18972.
Alemany, et al., "Solid- and Solution-State Nuclear Magnetic Resonance Analyses of Ecuadorian Asphaltenes:. Quantitative . . . ", Energy Fuels 2015,29, (10), 6317-6329.
Ardakani, J. et al., "A comparative study of ring opening of naphthalene, tetralin and decalin over M02CfHY and Pdf HY catalysts", Appl. Catal. 2011,403,36-47.
Biswas, P. et al., "Characterization and Activity of ZrO2 Doped SBA-15 Supported NiMo Catalysts for . . . ", Industrial & Engineering Chemistry Research 2011, 50 (13) 7882-789.
Boek, E.S., et al., "Quantitative molecular representation of asphaltenes and molecular dynamics simulation of •. . . " Energy Fuels 2009,23(3), 1209-1219.
Bouhadda, Y., et al., "Second order Raman spectra of Algerian Hassi-Messaoud asphaltene", Fuel 2008, 87, (15-16), 3481-3482.
Cabrales-Navarro, F.A., et al., "Catalytic Steam Cracking of a Deasphalted Vacuum Residue Using a Ni/K Ultradispersed . . . ", Energy Fuels, 2017, 31 (3},3121-3131.
Campbell, D. M., et al., "Construction of a molecular representation of a complex feedstock by Monte Carlo and quadrature . . . ", Applied Catalysis A: General 1997, 160 (1) 41-54.
Campbell, J. H., et al., "Gas evolution during oil shale pyrolysis. 2. Kinetic and stoichiometric analysis", Fuel 1980, 59, 727-732.
Campbell, J. H., et al., "Gas evolution during oil shale pyrolysis. 1. Nonisothermal rate measurements", Fuel, 1980,59,718-726.
Chakravarty, T., et al., "Computer-Assisted Interpretation of Pyrolysis Mass Spectra of Two Oil Shales and Their Corresponding . . . ", Energy Fuels, 1988,2,191-196.
Chen, Y., et al., "The viscosity reduction of nano-keggin-K3PM012040 in catalytic aquathermolysis of heavy . . . ", Fuel, 2009, 88, 1426-1434.
Choi, J., et al., "Reducibility and toluene hydrogenation activity of nickel catalysts supported on gamma-Al203 and kappa-Al203", Catalysis Science & Tech. 2012, 2 (1) 179-186.
Choudhary, V. R., et al., "Oxidative Conversion of Methane to Syngas over Nickel Supported on Commercial Low Surface Area . . . ", Journal of Catalysis, 1997, 172 (2) 281-293.
Chuan, W., et al., "Mechanism for reducing the viscosity of extra heavy oil by aquathermolysis with an amphiphilic catalyst", J. Fuel Chern. Technol., 2010, 38 (6) 684-690.
Dejhosseini, M., et al., "Catalytic Cracking Reaction of Heavy Oil in the Presence of Cerium Oxide Nanoparticles in Supercritical Water", Energy Fuels, 2013, 27 (8) 4624-4631.
Diallo, M. S., et al., Thermodynamic properties of asphaltenes: a predictive approach based on computer assisted . . . , Developments in petroleum science, 2000, 40, 103-124.
Dumanli, A. G., et al., "Co-firing of biomass with coals Part 1. Thermogravimetric kinetic analysis of combustion of fir . . . ", J. Therm Anal. Calorim., 2011, 103,925-933.
Gabrienko, A., et al., "Chemical Visualization of Asphaltenes Aggregation Processes Studied in Situ with ATR-FTIR Spectroscopic . . . ", J. Phys. Chem. C, 2015,119 (5) 2646-60.
Kewen, L., et al., "Application of Carbon Nanocatalysts in Upgrading Heavy Crude Oil Assisted with Microwave Heating", Nano Lett., 2014,14,3002-3008.

(Continued)

*Primary Examiner* — Zakiya W Bates
(74) *Attorney, Agent, or Firm* — John Wilson Jones; Jones Delflache LLP (57) ABSTRACT

Asphaltene produced during the production of hydrocarbons in an underground reservoir may be reduced and decomposed by introducing into the underground reservoir a fluid having a catalyst of from about 3 to about 7% Ni with a magnesium oxide support or a catalyst of from about 15 to about 25% tungsten oxide with a zirconium oxide support or a mixture thereof. The viscosity of heavy oil within the underground reservoir is reduced in the presence of the catalyst.

14 Claims, 5 Drawing Sheets

(56) References Cited

OTHER PUBLICATIONS

Kowalewski, I., et al., "Preliminary results on molecular modeling of asphaltenes using structure elucidation programs in conjunction . . . " Energy Fuels, 1996, 10 (1) 97-107.
Larachi, F., et al., "X-ray Photoelectron Spectroscopy, Photoelectron Energy Loss Spectroscopy, X-ray Excited Auger . . . ", Energy Fuels, 2004, 18 (6) 1744-1756.
Liu, D., et al., Investigation on Asphaltene Structures during Venezuela Heavy Oil Hydrocracking under Various Hydrogen . . . , Energy Fuels, 2013,27 (7) 3692-3698.
Maity, S.K., et al., "Catalytic Aquathermolysis Used for Viscosity Reduction of Heavy Crude Oils: A Review," Energy Fuels, 2010, 24, 2809-2816.
Martin-Martinez, F. J., et al., "Molecular asphaltene models based on Clar sextet theory", RSC Adv., 2014, 5 (1) 753-759.
Nassar, N. N., et al., "Metal Oxide Nanoparticles for Asphaltene Adsorption and Oxidation", Energy Fuels, 2011, 25 (3) 1017-1023.
Oliveira, E. C. d. S., et al., "Study of Brazilian asphaltene aggregation by Nuclear Magnetic Resonance spectroscopy", Fuel, 2014, 117 (PA) 146-151.
Pomerantz, A. E., et al., "Two-step laser mass spectrometry of asphaltenes", Journal of the American Chemical Society, 2008,130 (23) 7216-7217.
Rodriguez-Castellon. E., et al., "Nickel and cobalt promoted tungsten and molybdenum sulfide mesoporous catalysts for hydrodesulfurization", Fuel, 2008, 130 (23) 7216-7217.
Ruiz-Morales, Y., et al., "Polycyclic aromatic hydrocarbons of asphaltenes analyzed by molecular orbital calculations with optical spectroscopy", 2007, 21(1) 256-265.
Ruiz-Morales, Y., et al., "HOM-LUMO gap as an index of molecular size and structure for polycyclic aromatic hydrocarbons . . . ", The J. of Phys. Chem. A 2002,106(46) 11283-11308.
Sabbah, H., et al., "Laser Desorption Single-Photon Ionization of Asphaltenes: Mass Range, Compound Sensitivity, and Matrix Effects", Energy Fuels, 2012, 26 (6) 3521-3526.
Sabbah, H., et al., "Comparing Laser Desorption/Laser Ionization Mass Spectra of Asphaltenes and Model compounds", Energy Fuels, 2010, 24, 3589-3594.
Schacht, P., et al., "Upgrading of Heavy Crude Oil with W—Zr Catalyst", Advances in Chemical Engineering and Science 2014, 4, 250-257.
Sheremata, J. M., et al., "Quantitative molecular representation and sequential optimization of Athabasca asphaltenes", Energy Fuels 2004,18 (5) 1377-1384.
Siddiqui, M. N., "Catalytic pyrolysis of Arab Heavy residue and effects on the chemistry of asphaltene", Journal of Analytical and Applied Pyrolysis 2010,89, (2) 278-285.
Soultanidis, N., et al., "Relating n-Pentane Isomerization Activity to the Tungsten Surface . . . ", J. of the American Chern. Society 2010, 132, (38), 13462-13471.
Steck S. J., et al., "Mass Spectrophotometric Volatilization Studies of . . . ", Symp. on High Temperature and Rapid Heating Reactions of Fuels, Div. Fuel Chem., ACH, Chicago 1970.
Tuinstra, F., et al., "Raman Spectrum of Graphite", Journal of Chemical Physics 1970, 53 (3) 1126-1130.
Usui, K., et al., "Catalytic hydrocracking of petroleum-derived asphaltenes by transition metal-loaded zeolite catalysts", Fuel, 2004,83 (14-15) 1899-1906.
Venkataraman, P., et al., "Molecular Insights into Glass Transition in Condensed Core Asphaltenes", Energy Fuels, 2017,31(2) 1182-1192.
Verma, Manjusha, et al., "Poster", presented at ACS Conference, Denver, CO, Mar. 22-26, 2015.
Vicerich, M. A., et al., "Influence of Na content on the catalytic properties of Pt—Ir/A1203 catalysts for selective ring opening of decalin", Appl. Catal., 2014, 480, 42-49.
Wang. S., et al., "Study of asphaltene adsorption on kaolinite by X-ray photoelectron spectroscopy and time-of-flight secondary ion . . . ", Energy Fuels 2013,27 (5) 2465-2473.
Wang, H., et al., Supporting Tungsten Oxide on Zirconia by Hydrothermal and Impregnation Methods and Its Use as a Catalyst to Reduce . . . , Energy Fuels 2012,26 (11) 6518-6527.
Zhao, H., et al., "Thermal characteristics of bitumen pyrolysis", J. Therm Anal. Calorim, 2012,107,541-547.
Zhao, H., et al., "Kinetics and selectivity of asphaltene hydrocracking", Fuel, 2011,90(5)1900-1906.
Zhao, Y. X., et al., "Kinetics of asphaltene thermal cracking and catalytic hydrocracking", Fuel Processing Technology, 2011,92 (5) 977-982.
Zhou, W. et al., "Identification of active Zr—WOx clusters on a Zr02 support for solid acid catalysts", Nature Chemistry, 2009, 1 (9) 722-728.

\* cited by examiner

METHOD FOR DECOMPOSING ASPHALTENE USING A SUPPORTED CATALYST

FIELD OF THE DISCLOSURE

The disclosure relates to a method of decreasing the viscosity of heavy oil downhole by introducing into an underground reservoir a fluid having a catalyst of from about 3 to about 7% Ni with a magnesium oxide support or a catalyst of from about 15 to about 25% tungsten oxide with a zirconium oxide support or a mixture thereof.

BACKGROUND OF THE DISCLOSURE

Crude oil from subterranean hydrocarbon reservoirs typically has four fractions: saturates (saturated hydrocarbons), aromatics, resins and asphaltenes. Asphaltenes originate from organic deposits which are insoluble in long chain hydrocarbons solvents, such as pentane or heptane. Asphaltenes have deleterious effects on the extraction of oil. For instance, asphaltenes are generally stable in bulk oil at relatively high pressures and tend to precipitate at lower pressures called "onset pressure". As reservoir pressure decreases and drops below the onset pressure during hydrocarbon production, asphaltenes precipitate which blocks production routes and tubing, then flocculates and deposits in the pores of the formation, coats boreholes, and solidifies in downhole equipment. Wells with excessive asphaltene deposition may incur high remediation costs but, more importantly, are exposed to levels of formation damage that can greatly shorten the productive life of the well.

It has been reported that high viscosity of heavy crude oil may be attributable (at least in part) to the presence of asphaltenes. Efforts to decrease the viscosity of heavy oil in order to increase the flow of hydrocarbons from the well include in-situ precipitation of asphaltenes. Asphaltene inhibitors have been used to reduce the precipitation of asphaltenes and/or prevent the precipitation of asphaltenes from crude oil in flow lines and tubulars. This maximizes the potential for hydrocarbon production from the well. Light, aliphatic hydrocarbons also have been used in cyclic solvent injection systems to precipitate asphaltenes. Some inhibitors though are toxic and may remain present downhole for extended periods of time.

Improved methods for decreasing the viscosity of heavy oil and to break down asphaltenes are therefore desired.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

The disclosure relates to a catalyst having from about 3 to about 7% Ni on a magnesium oxide support or having from about 15 to about 25% tungsten oxide on a zirconium oxide support or a mixture thereof.

In an embodiment, the disclosure relates to a catalyst of (i) 5% (by weight) Ni on a magnesium oxide support; (ii) 20% (by weight) tungsten oxide on a zirconium oxide support or a mixture thereof.

In an embodiment, the disclosure relates to a catalyst of (i) between from about 3 to about 7% (by weight) Ni and from about 3 to about 7% (by weight) Mo on a magnesium oxide support; (ii) from about 3 to about 7% Ni (by weight) and from about 15 to about 25% (by weight) tungsten oxide on a magnesium oxide support; (iii) from about 3 to 7% Cu (by weight) and from about 15 to 25% (by weight) tungsten oxide on a zirconium oxide support; or (iv) a combination of any of (i), (ii) or (iii).

In an embodiment, the disclosure relates to a catalyst of (i) 5% (by weight) Ni and 5% (by weight) Mo on a magnesium oxide support; (ii) 5% Ni (by weight) and 20% (by weight) tungsten oxide on a zirconium oxide support; (iii) 5% (by weight) Cu and 20% (by weight) tungsten oxide on a zirconium oxide support; or (iv) a combination of any of (i), (ii) or (iii).

The disclosure further relates to a method for decomposing asphaltene downhole by contacting the asphaltene with a catalyst having from about 3 to about 7% Ni on a magnesium oxide support or having from about 15 to about 25% tungsten oxide on a zirconium oxide support or a mixture thereof.

In an embodiment, the disclosure relates to a method for decomposing asphaltene downhole by contacting the asphaltene with a catalyst of (i) 5% (by weight) Ni on a magnesium oxide support; (ii) 20% (by weight) tungsten oxide on a zirconium oxide support or a mixture thereof.

In an embodiment, the disclosure relates to a method for decomposing asphaltene downhole by contacting the asphaltene with a catalyst of (i) between from about 3 to about 7% (by weight) Ni and from about 3 to about 7% (by weight) Mo on a magnesium oxide support; (ii) from about 3 to about 7% Ni (by weight) and from about 15 to about 25% (by weight) tungsten oxide on a magnesium oxide support; (iii) from about 3 to 7% Cu (by weight) and from about 15 to 25% (by weight) tungsten oxide on a zirconium oxide support; or (iv) a combination of any of (i), (ii) or (iii).

In an embodiment, the disclosure relates to a method for decomposing asphaltene downhole by contacting the asphaltene with a catalyst of (i) 5% (by weight) Ni and 5% (by weight) Mo on a magnesium oxide support; (ii) 5% Ni (by weight) and 20% (by weight) tungsten oxide on a zirconium oxide support; (iii) 5% (by weight) Cu and 20% (by weight) tungsten oxide on a zirconium oxide support; or (iv) a combination of any of (i), (ii) or (iii).

In another embodiment, a method for decomposing asphaltene in heavy oil in an underground reservoir is provided. In this method, a fluid comprising a catalyst is introduced into the underground reservoir. The catalyst may be a catalyst set forth in any of the above paragraphs. Asphaltene in the heavy oil may be decomposed in the presence of the catalyst. One or more of the following are produced from the decomposition of asphaltene in the presence of the catalyst: methyl naphthalene; 1-methyl, 4-propyl benzene; 1-methyl, 3-propyl benzene; o-cymene; 2-syn methyl, cis-decalin; 2-ethyl-1,4-dimethyl benzene; 1-methyl, 3-propyl cyclohexane; 1-methyl-2-propyl cyclopentane; 1-methyl, 3-ethyl cyclohexane; 2,3-dimethyl pentane; n-hexane; and 1-methyl, 3-ethyl cyclopentane.

In another embodiment, a method for decomposing asphaltene in heavy oil in an underground reservoir is provided. In this method, steam having a catalyst is introduced into the underground reservoir. In an embodiment, no hydrocarbon solvent is present in the steam introduced into the reservoir. The catalyst may be a catalyst set forth in any of the above paragraphs. The catalyst breaks down one or more carbon/sulfur bonds, carbon/hydrogen bonds, carbon/oxygen bonds or carbon/carbon bonds in the asphaltenes.

In another embodiment of the disclosure, a method of decreasing the viscosity of heavy oil in an underground reservoir is provided. In this embodiment, a fluid comprising a catalyst is introduced into the underground reservoir. The catalyst may be any of the catalysts set forth in the paragraphs above. Asphaltenes are decomposed in the presence of the catalyst. The viscosity of the heavy oil in the underground reservoir is reduced by the decomposition of the asphaltenes in the presence of the catalyst. Light hydrocarbons produced by the decomposition of the asphaltenes may solubilize at least a portion of other products produced during the decomposition of the asphaltenes.

Accordingly, the present disclosure includes features and advantages which decrease the viscosity of heavy oil. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." The term "composing" may be interpreted as "consisting of" in a closed-ended fashion or as "consisting essentially of". Further, reference herein and in the appended claims to components and aspects in a singular tense does not necessarily limit the present disclosure or appended claims to only one such component or aspect, but should be interpreted generally to mean one or more, as may be suitable and desirable in each particular instance.

When introduced into an underground reservoir, the catalyst disclosed herein accelerates the alteration of the molecular structure of asphaltenes in heavy oil produced in the reservoir. Included in the term "underground reservoir" are carbonate formations, sandstone formations and shale.

The catalyst is transported into the reservoir in a carrier fluid. The carrier fluid is preferably a liquid (such as water or an organic solvent) or steam. Reduction in viscosity in a sample of heavy oil has been observed to occur in a shorter time when the carrier fluid contains the catalyst versus when the carrier fluid does not contain the catalyst. Further, reduction in viscosity in heavy oil occurs at a lower temperature downhole when the carrier fluid contains the catalyst versus when the carrier fluid not containing the catalyst. The improvement in viscosity reduction by use of the catalyst downhole translates to an increased flow of heavy oil from the reservoir and increased efficiency in the production of lighter hydrocarbons from the reservoir.

The catalyst, when introduced into heavy oil downhole breaks ups asphaltenes which are present in the heavy oil. The catalysts are active in the absence of hydrogen. Viscosity of the heavy oil is therefore decreased by decomposing asphaltenes in the presence of the catalyst. Less viscous oil containing light hydrocarbons may then be returned to the surface of the wellbore.

As used herein, "heavy oil" shall refer to heavy crude oil or extra heavy crude oil or any liquid petroleum with an API gravity less than 22°, generally having a viscosity greater than 100 cP, typically characterized by a high content of asphaltenes (containing most of the sulfur and the metals in the oil). The viscosity of the heavy oil prevents easy flow to production wells under normal reservoir conditions. In contrast to heavy oil, light oil typically has an API gravity greater than 31°.

The terms "decomposing" and "decomposition" used herein shall include breaking down or the breakdown of the molecular structure of asphaltenes into smaller molecules.

Suitable catalysts are supported catalysts of nickel and tungsten oxide and metal modified (bimetallic) catalysts of nickel and tungsten oxide. Such catalysts, in addition to nickel and tungsten oxide, may also include molybdenum and copper. A preferred catalyst is nickel, optionally with molybdenum, on a magnesium oxide support as well as tungsten oxide, optionally having nickel or copper on a zirconium oxide support. The bimetallic catalysts, like the monometallic catalysts, have been demonstrated to be not sintered at downhole reaction conditions. The bimetallic catalysts have also been demonstrated to exhibit greater activity and to enhance viscosity reduction more than the monometallic catalysts.

Tungsten oxide as used herein may include $W_2O_3$, $WO_2$, $WO_3$ or $W_2O_5$ or a mixture thereof. The support is either magnesium oxide or zirconium oxide.

The catalyst may either comprise or be composed of from about 3 to about 7% by weight of Ni with a magnesium oxide support or from about 15 to about 25% by weight tungsten oxide with a zirconium oxide support or a mixture thereof.

In a preferred embodiment, the catalyst is composed of 5% by weight Ni on a magnesium oxide support. In another preferred embodiment, the catalyst is composed of 20% by weight tungsten oxide on a zirconium oxide support.

In an embodiment, the catalyst may also contain an additional metal. For instance, the catalyst may either be comprised or composed of any of the following as well as combination thereof:
  (i) from about 3 to about 7% (by weight) Ni and from about 3 to about 7% (by weight) Mo on a magnesium oxide support;
  (ii) from about 3 to about 7% Ni (by weight) and from about 15 to about 25% (by weight) tungsten oxide on a magnesium oxide support.
  (iii) from about 3 to 7% Cu (by weight) and from about 15 to 25% (by weight) tungsten oxide on a zirconium oxide support;

In a preferred embodiment, the catalyst may comprise or consist of one of the following or a combination thereof:
  (i) 5% (by weight) Ni and 5% (by weight) Mo on a magnesium oxide support;
  (ii) 5% Ni (by weight) and 20% (by weight) tungsten oxide on a zirconium oxide support; or
  (iii) 5% (by weight) Cu and 20% (by weight) tungsten oxide on a zirconium oxide support.

The catalysts disclosed herein are base catalysts and are thus compatible with the basicity within the reservoir at downhole conditions.

The particle size of the catalysts disclosed herein is preferably between from about 5 nm to about 10 nm.

The catalysts disclosed herein have been shown to break down carbon/sulfur bonds, carbon/hydrogen bonds, carbon/oxygen bonds and/or carbon/carbon bonds within asphaltene molecules. This causes cracking of heavy hydrocarbons in the oil and consequently the decrease in viscosity. This, in turn, results in the reduction of asphaltene contents in the heavy oil and an increase in saturates and aromatic content.

The reaction temperature required downhole for breaking of such bonds is less when the catalyst is introduced into the reservoir than when the catalyst is not introduced into the reservoir. The catalyst decreases the activation energy required for cracking of the heavy hydrocarbons in the heavy oil and hence the reaction temperature.

For instance, the breaking of C—S bonds in asphaltene in the presence of the catalyst has been confirmed by the formation of hydrogen sulfide. The reaction temperature for such C—S bond breaking has been demonstrated to be 250° C. This is in contrast to the reaction temperature of 350° C. which is required to break the C—S bonds in the asphaltene when decomposition occurs in the absence of the catalyst.

The amount of catalyst in the fluid introduced into the reservoir may be between from about 50 ppm to about 300 ppm and is dependent on the volume of oil in the reservoir.

The catalyst breaks asphaltenes in the heavy oil into lighter hydrocarbons including aromatics. For instance, the catalyst breaks asphaltenes into methyl naphthalene; 1-methyl, 4-propyl benzene; 1-methyl, 3-propyl benzene; o-cymene; 2-syn methyl, cis-decalin; 2-ethyl-1,4-dimethyl benzene; 1-methyl, 3-propyl cyclohexane; 1-methyl-2-propyl cyclopentane; 1-methyl, 3-ethyl cyclohexane; 2,3-dimethyl pentane; n-hexane; and 1-methyl, 3-ethyl cyclopentane as well as a combination thereof.

The viscosity of heavy oil is more rapidly decreased when the fluid introduced into the reservoir contains the catalyst than when the fluid does not contain the catalyst. The amount of viscosity reduction in the heavy oil increases as the period of time from introduction of the catalyst into the reservoir increases. For instance, the amount of viscosity reduction 30 days from introduction of the fluid containing the catalyst into the reservoir may be several times greater compared to the amount of viscosity reduction 3 days after introduction of the catalyst containing fluid into the reservoir.

While the catalyst may be introduced into the underground reservoir in an aqueous stream during the displacement of the heavy oil downward into the well, it is more advantageously introduced into the reservoir in a fluid. The fluid may be free of hydrocarbon solvents and/or water. The fluid is preferably steam.

In a preferred embodiment, the catalyst is carried into the underground reservoir in steam which is free of both hydrocarbon solvents and water. The presence of hydrocarbons in the carrier fluid of the catalyst is typically unnecessary since hydrocarbons are produced downhole at lower temperatures than normally observed.

In an embodiment, as light hydrocarbons are produced from the decomposition of asphaltenes, they may solubilize other decomposition products. For instance, at least a portion of decomposition products from asphaltenes may be solubilized in such light hydrocarbons as methyl-naphthalene; 1-methyl, 3-propyl benzene; 1-methyl, 4-propyl benzene or o-cymene or a combination thereof.

Preferred embodiments of the present disclosure thus offer advantages over the prior art and are well adapted to carry out one or more of the objects of this disclosure. However, the present disclosure does not require each of the components and an act described above and is in no way limited to the above-described embodiments or methods of operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended drawings and claims.

All percentages set forth in the Examples are given in terms of weight units and all measurements are performed at atmospheric pressure except as may otherwise be indicated.

EXAMPLES

Example 1

Preparation of 5% Ni/MgO Catalyst

The incorporation of Ni into a MgO support substrate (~10 nm) was performed by deposition-precipitation (DP) method. The MgO supports were purchased from the Sigma Aldrich, and they were kept under a vacuum to exclude the air in the pores of support. First, a stoichiometric amount of reactants, i.e., Ni $(NO_3)_2 \cdot 6H_2O$ (nickel nitrate hexahydrate, 0.08 mol) were weighed in a beaker and dissolved subsequently into 100 mL deionized (DI) water. The solution was stirred with a magnetic stirrer at room temperature until a homogeneous solution was obtained. Whereafter, the homogeneous solution was transferred into a glass vessel containing 32.64 g of MgO supports, sealed, and placed in oil bath heating at 115° C. for 2.5 h of deposition-precipitation, resulting in precipitation of the nickel precursor (a light green sediment) on MgO supports. After the reaction was complete, the mixture was cooled to ambient temperature and then filtered. The light green solid spheres were washed with DI water to neutral and colorless for removing the possible absorbed ions and chemicals. The light green spheres were then dried in an oven at 90° C. for 6 h. The dried spheres were then calcined in a muffle furnace at 400° C. for 1 h in air atmosphere, respectively. This process resulted in the precipitated nickel precursor on support to decompose to nickel oxide. The resulting catalyst product, NiO/MgO, was then collected for further analysis. Deionized water was used throughout the preparation process.

Example 2 of 5% Ni 5% Mo/MgO Catalyst

A representative 5% Mo-5% Ni/MgO catalyst was prepared by impregnating the 5% Ni/MgO support with aqueous solutions of Ni precursors according to the following procedure. First, an aqueous solution of $NiNO_3.6H_2O$ (Sigma Aldrich, 0.145 g dissolved in 1 ml of water) was prepared. It was then transferred to a glass vessel containing 5% Ni/MgO (3.0 g). The resulting paste was dried at 80° C. for 8 h and calcined in static air, typically at 400° C. for 3 h. The material was then dried at about 80° C. for 8 hours and subjected to a programmed heat treatment in air according to the following schedule: (i) a heating rate of 5° C./min ramp up to 400° C.; (ii) hold at 400° C. for 3 hrs; and (iii) a cooling rate of 10° C./min ramp down to room temperature.

Example 3

Preparation of 20% $WO_x/ZrO_2$ Catalyst

The active elements of this catalyst are zirconium, tungsten and oxygen. Six grams of $ZrOCl_2.8H_2O$ (Aldrich 99%) were dissolved in 300 mL of water in a beaker and then stirred at room temperature. A solution of 16 grams of $Na_2WO_4.2H_2O$ (FLUKA 98%) in 100 mL of water was also prepared and added to the solution of $ZrOCl_2.H_2O$. The resulting solution immediately turned turbid. After stirring this solution for about 30 minutes, 200 ml 1 N of HCl (MERICHEM 37%) was also added and the mixture was stirred for one more hour and allowing it to stand still overnight at room temperature. The precipitate formed was separated by filtration. Then it was dried in an oven for 12 h at 120° C. and calcined at 600° C. under air for 4 h.

Example 4

Preparation of 20% $WO_x/ZrO_2$ Catalyst

The active elements of this catalyst are zirconium, tungsten and oxygen. Six grams of $ZrOCl_2.8H_2O$ (Aldrich 99%) were dissolved in 300 mL of water in a beaker and then stirred at room temperature. A solution of 16 grams of $Na_2WO_4.2H_2O$ (FLUKA 98%) in 100 mL of water was also prepared and added to the solution of $ZrOCl_2.H_2O$. The resulting solution immediately turned turbid. After stirring this solution for about 30 minutes, 200 ml 1 N of HCl (MERICHEM 37%) was also added and the mixture was stirred for one more hour and allowing it to stand still overnight at room temperature. The precipitate formed was separated by filtration. Then it was dried in an oven for 12 h at 120° C. and calcined at 600° C. under air for 4 h.

Example 5

Preparation of 5% Cu-20% $WOx/ZrO_2$ Catalyst

A representative 5% Cu-20% $WOx/ZrO_2$ catalyst was prepared by impregnating the 20% $WO_x/ZrO_2$ support with aqueous solutions of Cu precursors. First, an aqueous solution of $CuNO_3.9H_2O$ (Sigma Aldrich, 0.734 g dissolved in 2 ml of water) was transferred to a glass vessel containing 20% $WO_x/ZrO_2$ (4.0 g). The resulting paste was then dried at 80° C. for 8 h and calcined in static air, typically at 400° C. for 3 h. The material was then dried at about 80° C. for 8 hours and subjected to a programmed heat treatment in air according to the following schedule: (i) a heating rate of 5° C./min ramp up to 400° C.; (ii) hold at 400° C. for 3 hour; (iii) a cooling rate of 10° C./min ramp down to room temperature.

Example 5

Example 6

Figure 1:
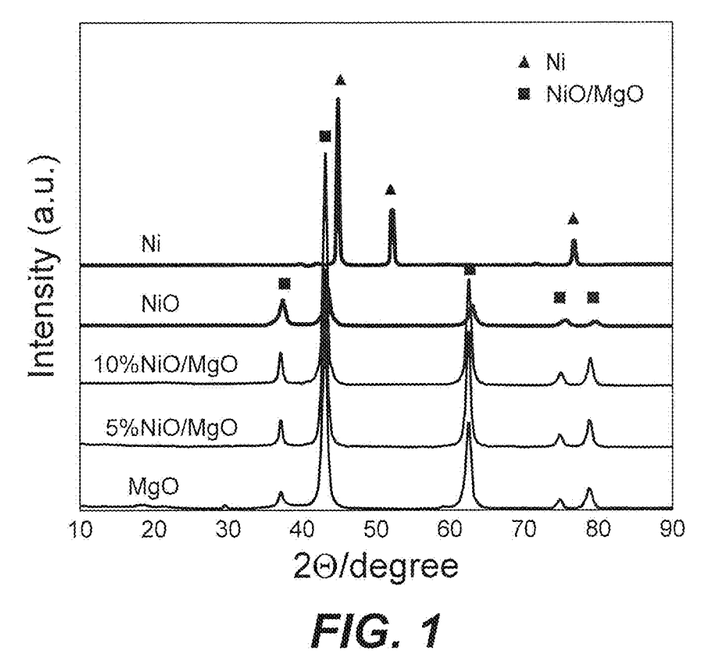
FIG. 1 is an X-ray diffractogram of various synthesized catalysts in accordance with the teachings herein.
Figure 2:
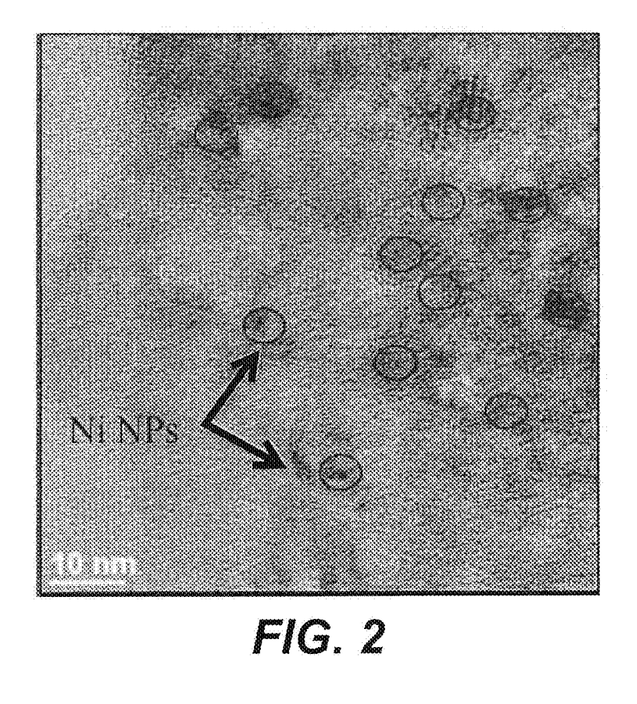
FIG. 2 is a transmission electron microscope image of 5% Ni/MgO NPs, prepared in accordance with the teachings herein.

The catalysts of Examples 1-4 were analyzed using X-ray powder diffraction (XRD) analysis on a Rigaku 300 instrument. Copper Kα1 radiation was used with a power setting of 30 kV and 30 mA. No separate NiO phases were discernible by XRD. Therefore, at low Ni content, nickel oxide was present in ceria, but, in nanoparticle form. The XRD is set forth in FIG. 1. As shown in FIG. 1, XRD patterns of all the solid-base samples revealed the main characteristic peaks of magnesia and peaks of NiO were observed. This showed that the NiO and $MO_3$ and $Co_2O_3$ phase were spread on the surface of the MgO support in amorphous form or a solid solution is formed. The transmission electron microscope image, shown in FIG. 2, also confirms that 5% Ni/MgO exists as crystallized nanoparticles around 10 nm.

Example 7

The performance of the catalysts of Examples 1-3 were evaluated by tests in a "Stem Tube" batch reactor. The reactor was a cylinder made from Hastelloy C. 17 cm in length and 16 $cm^3$ in volume. The oil sample was pretreated in the following steps for better uniformity. The oil sample was first heated in an oven at 100° C. for 20 minutes. The container was then taken out of the oven and rolled for 5 minutes. The container was then cooled at room temperature for several minutes. The oil sample was then transferred to a centrifuge tubes at 50~60° C., and centrifuged at room temperature at a gravitational acceleration of 3500 rpm for 20 minutes. The centrifuged oil was distilled at 150° C. for 1 hour to separate the water cut. The remaining oil was then used as the feed for stem tube testing.

Before testing, the stem tubes were disassembled and cleaned with toluene, water, and acetone and then dried overnight in an oven. The following items were then added into the Stem Tube in the following order: (i) 10 g of oil feed; (ii) 0.2 g of catalyst and (iii) 3 g of 2 mm glass beads. The stem tube was then sealed and kept in a 100° C. oven for 20 minutes in the vertical direction. While heated in the oven, the stem tube was turned upside down every 5 minutes for better mixing. After 20 minutes, the stem tube was cooled to room temperature.

A tubular oven with protective stainless steel tubing was used to run the stem tube testing at high temperatures. Multiple (usually 6-7) stem tubes were placed in the protective stainless steel tubing and then heated as follows: (i) room temperature to 250° C. in 3 hours; (ii) 250° C. for 36 hours; (iii) 250° C. to 60° C. in 4 hours; and (iv) 60° C. The stem tubes were then opened and products were collected into centrifuge tubes. The products were centrifuged at room temperature at 3500 rpm for 20 minutes and then kept at room temperature for 24 hours before further analysis.

Product analysis included viscosity and density (by viscometer), compositional analysis (by solvent extraction, GC-MS, and simulated distillation GC), and thermogravimetric analysis (by TGA-MS). Products were injected into viscometer directly without further treatment; viscosity and density were measured at 30° C. If the viscosity was higher than 12,000 cP at 30° C., measurement temperature was increased to make the viscosity lower than 12,000 cP. Products were analyzed by GC-MS to identify new compounds after reaction, providing information for reaction mechanism. Products were also analyzed by simulated distillation GC, following ASTM D2887, to get boiling-point distribution, indicating compositional change after reaction. Solvent extraction was performed according to ASTM D6560, in order to separate products into maltenes and asphaltenes. Ratios of maltenes to asphaltenes could indicate compositional change after reaction. Asphaltenes were analyzed by TGA-MS to get thermogravimetric properties from room temperature to 550° C.

Representative 5% Ni/MgO and 20% WOx/ZrO2 catalysts were evaluated for their ability to catalyze the heavy oil reaction in a conventional stem tube reactor. The catalyst compositions of Examples 1-3 were tested at ambient pressure conditions as described in the paragraph above. The data reported in Table I through Table IV were obtained after at least 36 hours on stream at the specified conditions. Table I represents asphaltene contents before and after reaction. Table II and Table III shows the effect of promoted and unpromoted catalysts on heavy oil viscosity reduction;

TABLE I

Reaction Temp: 250° C., Reaction Time: 36 h

| Catalyst/Feed | Viscosity Reduction (%) | C7 Asphaltene (wt. %) | Asphaltene Reduction (%) |
|---|---|---|---|
| Original Crude oil | — | 10.15 | — |
| No Catalyst | −0.35 | 10.1 | 0.5 |
| 5% Mo—5% Ni/MgO | −26.6 | 8.4 | 17.24 |
| 5% Ni—20% WO$_x$/ZrO$_2$ | −27.6 | 7.7 | 24.1 |

TABLE II

Reaction Temp: 250° C., Reaction Time: 36 h

| Catalyst | Viscosity Pre-reaction (CP) | Viscosity Post Reaction (CP) | Viscosity Change (%) |
|---|---|---|---|
| (NP-C) 20% WO$_x$/ZrO$_2$ | 11427 | 9095 | −20.4 |
| (NP-P-E) 5% Cu—20% WO$_x$/ZrO$_2$ | 11427 | 8531 | −25.35 |
| (NP-P-D) 5% Ni—20% WO$_x$/ZrO$_2$ | 11427 | 8396 | −26.5 |

TABLE III

Reaction Temp: 250° C., Reaction Time: 36 h

| Catalyst | Viscosity Pre-reaction (CP) | Viscosity Post Reaction (CP) | Viscosity Change (%) |
|---|---|---|---|
| (NP-A) 5% Ni/MgO | 13140 | 11215 | −14.6 |
| (NP-P-D) 5% Ni—20% WO$_x$/ZrO$_2$ | 13140 | 9703 | −26.15 |
| (NP-P-B) 5% Mo—5% Ni/MgO | 13140 | 10735 | −18.3 |

Figure 3A:
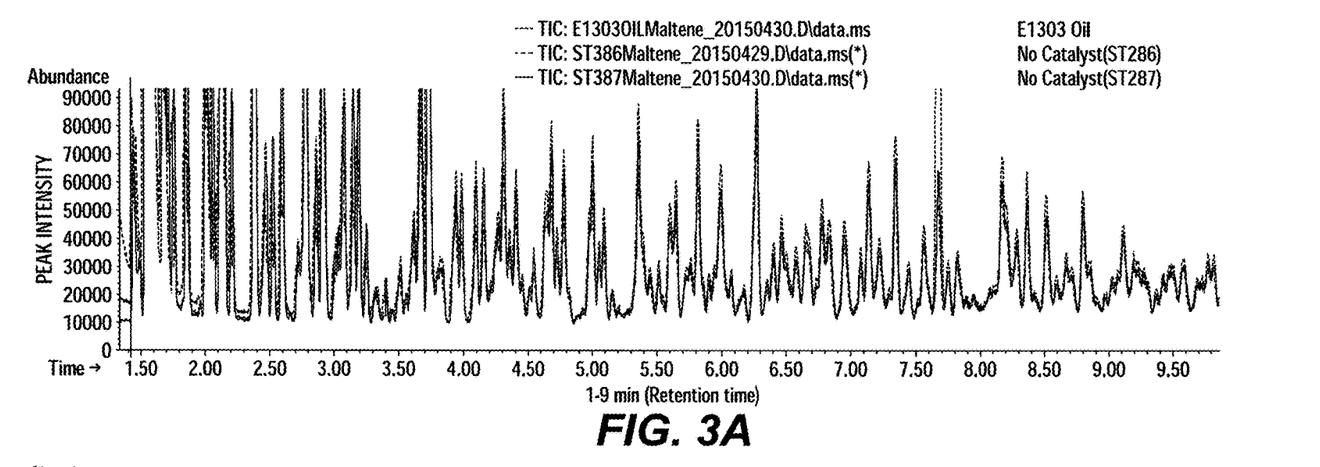
FIG. 3 is a GC-MS chromatogram of C5-maltene fractions before and after reaction with an oil sample in the presence of a 5% Mo-5% Ni/MgO catalyst.
Figure 3B:
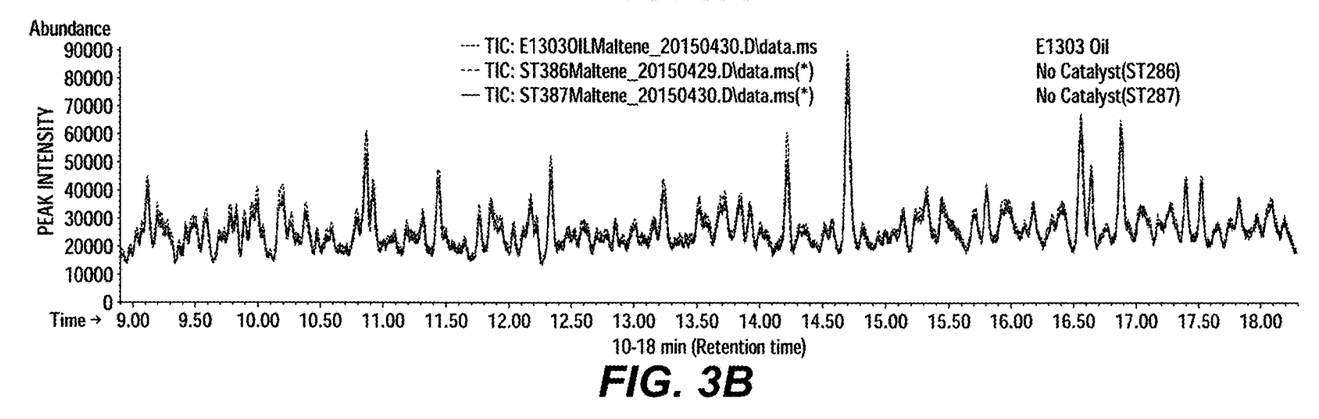
Figure 3C:
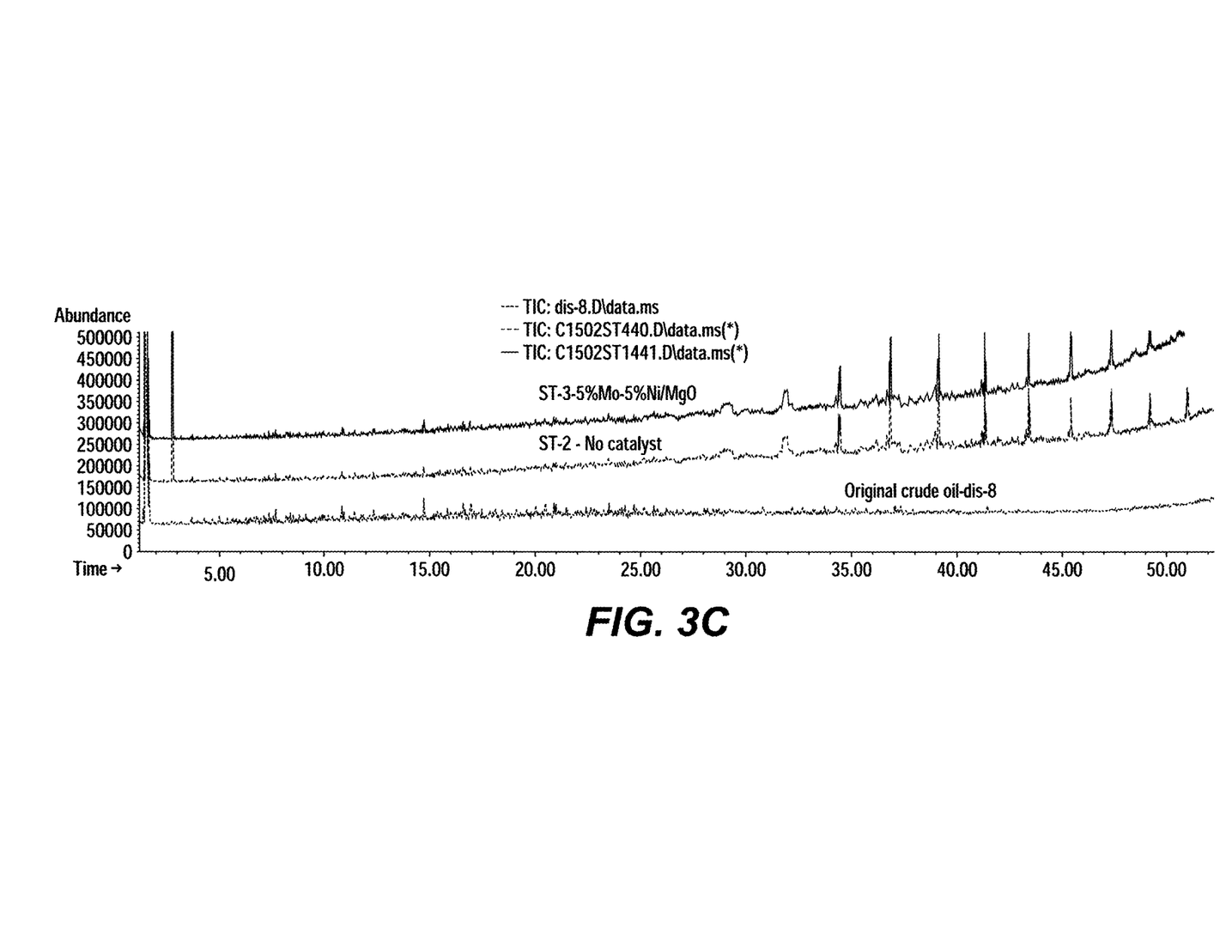

The maltene fractions were analysed using Agilent GC-MS. FIG. 3 shows the GC-MS chromatogram of maltene before and after reaction. The chromatogram doesn't show any additional peaks which indicate no reaction occurred at 250° C. in absence of catalyst. The GC-MS chromatogram was similar to the crude oil maltene fraction in the absence of catalyst, shown in FIGS. 3A and 3B. In the presence of a 5% Mo-5% Ni/MgO catalyst at 250° C. for 36 hrs, the GC-MS chromatogram (shown in FIG. 3C) shows a number of new peaks which are set forth in Table V below:

TABLE V

Compounds identified in GC-MS after catalytic reaction

| Peak number | Retention time (min) | Compound | Formula |
|---|---|---|---|
| 2 | 1.6 | n-hexane | $C_6H_{14}$ |
| 1 | 1.8 | 2,3-dimethyl pentane | $C_7H_{16}$ |
| 3 | 3.5 | 1-methyl, 3-ethyl cyclopentane | $C_8H_{16}$ |
| 4 | 4.2 | 1-methyl-2-propyl cyclopentane | $C_9H_{18}$ |
| 5 | 6.3 | 1-methyl, 4-propyl benzene | $C_{10}H_{14}$ |
| 6 | 6.4 | 1-methyl, 3-propyl benzene | $C_{10}H_{14}$ |
| 7 | 7.3 | 2-ethyl-1,4-dimethyl benzene | $C_{10}H_{14}$ |
| 8 | 8.6 | o-cymene | $C_{10}H_{14}$ |
| 9 | 9.1 | 1-methyl, 3-ethyl cyclohexane | $C_9H_{18}$ |
| 10 | 9.6 | 1-methyl, 3-propyl cyclohexane | $C_{10}H_{20}$ |
| 11 | 11.5 | Methyl naphthalene | $C_{11}H_{10}$ |
| 12 | 12.2 | cis-decalin | $C_{10}H_{18}$ |

FIG. 3C illustrates that aromatic hydrocarbon (mainly substituted aromatic hydrocarbons) are identified in the maltene fraction after reaction. Those hydrocarbons are related to substances presented in the pentane phase, which further confirm that catalytic reaction can make long-chain alkane rupture, and produce short-chain alkyl, most of the fragments dissolved in the oil phase. It further explains the reason for the destruction of C—C bond in the heavy oil reaction.

Example 7

Figure 4:
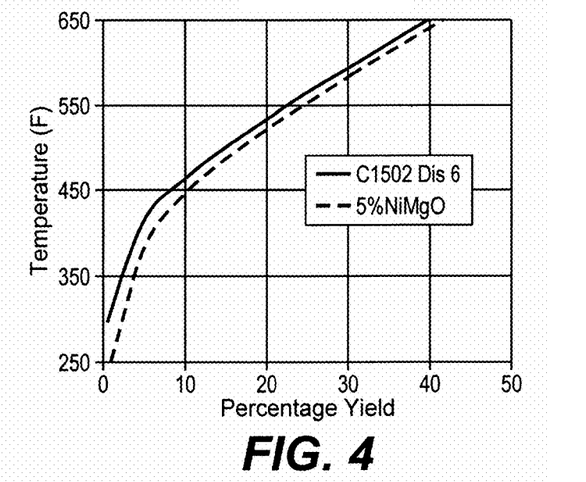
FIG. 4 is a Sim-Dis plot of crude oil after and before reaction with 5% Ni/MgO catalyst.
Figure 5:
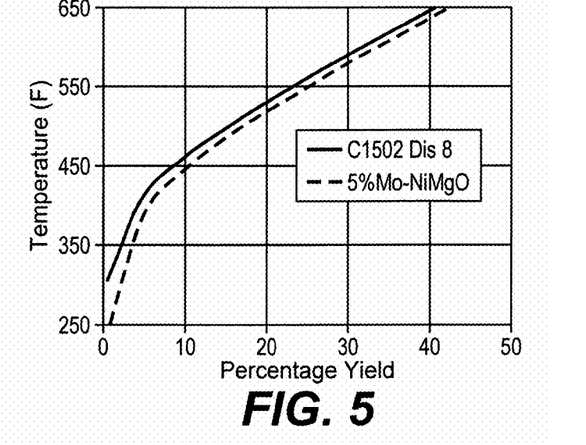
FIG. 5 is a Sim-Dis plot of crude oil after and before reaction with 5% Mo-5% Ni/MgO catalyst.
Figure 6:
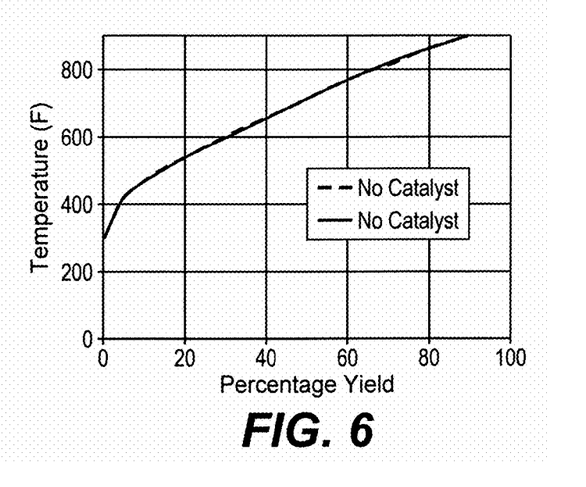
FIG. 6 is a Sim-Dis plot of crude oil after and before reaction in absence of catalyst.

A Simulated distillation plot was made after catalytic reaction with the oil sample. 30 wt. % of processed oil was diluted with carbon disulfide solvent and injected in the simulated distillation using ASTM D2887 method. Distillation profiles of crude oil were thus determined. The method provided the boiling point distributions of both weight and volume percent amounts. The weight percent distribution was obtained from the measured total ion current signal. The total ion current signal was converted to weight percent amount by calibration with a reference crude oil of a known distillation profile. Knowledge of the chemical composition of the crude oil across the boiling range permitted the determination of the volume percent distribution. The long-term repeatability was equivalent to or better than the short-term repeatability of the currently available American Society for Testing and Materials (ASTM) gas chromatographic method for simulated distillation. FIG. 4 and FIG. 5 show the boiling point curve after and before reaction with catalyst. As illustrated, in the presence of catalyst, the heavy residue was converted into light components, naphtha and diesel. The yield of light components increased indicating the reactivity of catalyst for heavy fraction of crude oil. The post reacted sample with catalyst showed lower boiling fraction compound distilled at lower temperature. No change was noted for the original crude oil and blank reaction.

Example 8

The amount of sulfur present in the 5% Mo-5% Ni/MgO NPs catalyst after reaction with oil was determined by SEM-EDS ZAF. It was found that the precursor NPs did not contain sulfur at a detectable level <~1/10,000. The average elemental content of 6 EDS spectra per sample are shown in Table VI. The presence or elements in concentrations <0.1% was verified by close inspection of the spectra.

TABLE VI

| Catalyst | C | O | Mg | Ni | Mo | S |
|---|---|---|---|---|---|---|
| Fresh - (NP-P-B) 5% Mo—5% Ni/MgO | 64.62 | 24.52 | 8.38 | 0.54 | 1.82 | — |
| Used - (NP-P-B) 5% Mo—5% Ni/MgO | 61.23 | 25.66 | 9.63 | 0.65 | 2.13 | 0.22 |

For catalyst after reaction with heavy oil, the average S concentration was 0.22%. This indicating that the catalyst binds the sulfur atom from the heavy oil and breaks the C—S bond. The key finding is that the precursor nanocatalyst particles do not contain sulfur at a level detectable by EDS but catalyst after reaction has Sulfur.

Example 9

Preparation of 5% Ni-20% WOx/ZrO$_2$ NPs catalyst

A representative promoted 5% Ni-20% WOx/ZrO$_2$ catalyst was prepared by impregnating the 20% WO$_x$/ZrO$_2$ NPs with aqueous solutions of Ni precursors according to the following procedure. An aqueous solution of NiNO$_3$.6H$_2$O (Sigma Aldrich, 0.145 g dissolved in 1 ml of water) was added to 20% WO$_x$/ZrO$_2$ (3.0 g). The paste formed was dried at 80.0 for 8 h and calcined in static air at 400.0 for 3 h.

Example 10

This Example illustrates the effect of metal loading on the change in viscosity of heavy oil. The Ni loading was varied from 1% to 10% and the tungsten oxide was varied from 20 to 26% on the support MgO and ZrO$_2$, respectively. The 1% Ni loading on MgO showed a viscosity reduction around 10%. With increasing Ni loading to 5%, the viscosity reduction further enhanced to 17.6%. A further increase in metal loading to 8% rendered a decrease in viscosity reduction by 11%. Thus, 5% Ni loading was determined to be optimal for viscosity reduction. With the addition of tungsten oxide promoter supported on zirconium oxide, as the Ni loading increased from 1% to 5% the viscosity reduction was seen to increase from 19% to 25.2%. The results are set forth in Table VII below:

TABLE VII

| Catalyst | Viscosity Change (%) |
|---|---|
| MgO | −2 |
| 1% Ni/MgO | −10 |
| 5% Ni/MgO | 17.6 |
| 8% Ni/MgO | −11 |
| 10% Ni/MgO | −12.5 |
| 20% WO$_x$/ZrO | −20.7 |
| 26% WO$_x$/ZrO$_2$ | −12 |
| 1% Ni—20% WO$_x$/ZrO$_2$ | −19 |
| 1% Ni—20% WO$_x$/ZrO$_2$ | 25.2 |

Example 11

This Example illustrates the effect of different supports for catalytic activity. The various supports tested included CeO$_2$, Y-Zeolite, WOX/ZrO$_2$, MgO, Al$_2$O$_3$ and SBA. In each of the tests, the Ni loading on the different supports was the same. The results are set forth in Table VIII which establishes the 5% Ni/MgO catalyst as providing the best results. Table IX demonstrates the effect of metal loading of nickel and tungsten oxide on magnesium oxide and tungsten oxide supports, respectively.

TABLE VIII

| Catalyst | Viscosity Change (%) |
|---|---|
| 5%Ni/CeO$_2$ | −10 |
| 5%Ni/Y-Zeolite | −7 |
| MgO | −2 |
| 1% Ni/MgO | −10 |
| 5% Ni/MgO | 17.6 |
| 8% Ni/MgO | −8 |
| 5% Ni/SBA | −12.6 |
| 10% Ni/MgO | −12.5 |
| 5% Ni/Al$_2$O$_3$ | −6.5 |

TABLE IX

| Bimetal Catalyst | Single metal Catalyst | Temperature: 250° C., Time: 36 h Viscosity Change (%) @30° C. | | | Standard deviation (%) |
|---|---|---|---|---|---|
| | | Run 1 | Run 2 | Run 3 | |
| — | 5% Ni/MgO | 17.6 | 15.2 | 16.3 | 1.2 |
| — | 20% WOx/ZrO$_2$ | 20.4 | 19.8 | 17.2 | 1.7 |
| 5% Mo | 5% Ni/MgO | 19.5 | 21.0 | 17.8 | 1.6 |
| 5% Ni | 20% WO$_x$/ZrO$_2$ | 25.2 | 27.1 | 29.0 | 1.9 |
| 5% Cu | 20% WO$_x$/ZrO$_2$ | 26.7 | 24.1 | 25.8 | 1.3 |

Example 12

This Example addresses the effect of water and sand on viscosity reduction under reservoir conditions wherein the catalyst under water and in porous media (before core flooding) were tested.

Figure 7:
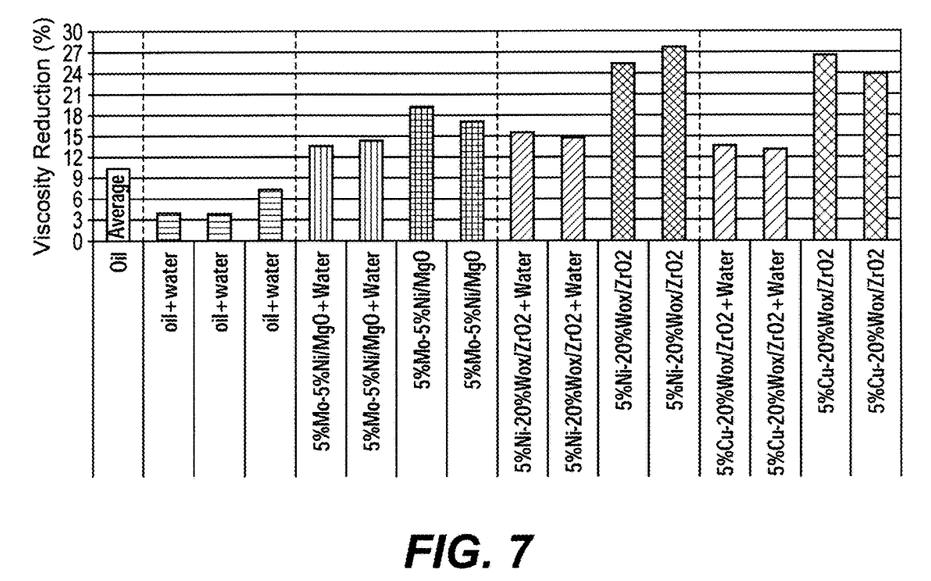
FIG. 7 demonstrates the effect of water on oil and catalyst mixtures on viscosity reduction.

In Situ Conditions Effect of Water. The effects of water was determined by first mixing crude oil and water at a mass ratio of 90:10 and heated to 250° C. for 36 hours to study the effects of water. This served as the base run. Then the effect of catalyst was then examined in the oil and water mixture. The crude oil, water and catalyst were mixed at a mass ratio of 89.80:10:0.2 and heated to 250° C. for 36 hours to determine the effects of water. Water was then separated from the oil by centrifuge and the viscosities of upgraded oil were measured at 30° C. The viscosity of upgraded oil as a function of the different catalysts is plotted in FIG. 7 (viscosity reduction expressed as (viscosity before upgrading–viscosity after upgrading)/viscosity before upgrading. FIG. 7 shows that the viscosity (at 30° C.) was reduced by 4±2% due to the reaction of water with oil only and the viscosity was reduced to 12±2% for 5% Mo-5% Ni/MgO catalyst when it was compared to absence of water (which means oil with catalyst). Similarly other catalysts, such as 5% Ni-20% $WO_x$/ZrO2 and 5% Cu-20% $WO_x$/$ZrO_2$ showed similar trends in the presence of water. FIG. 7 shows that while catalytic activity decreased in the presence of water, the viscosity of the oil was reduced in the presence of the catalyst.

Figure 8:
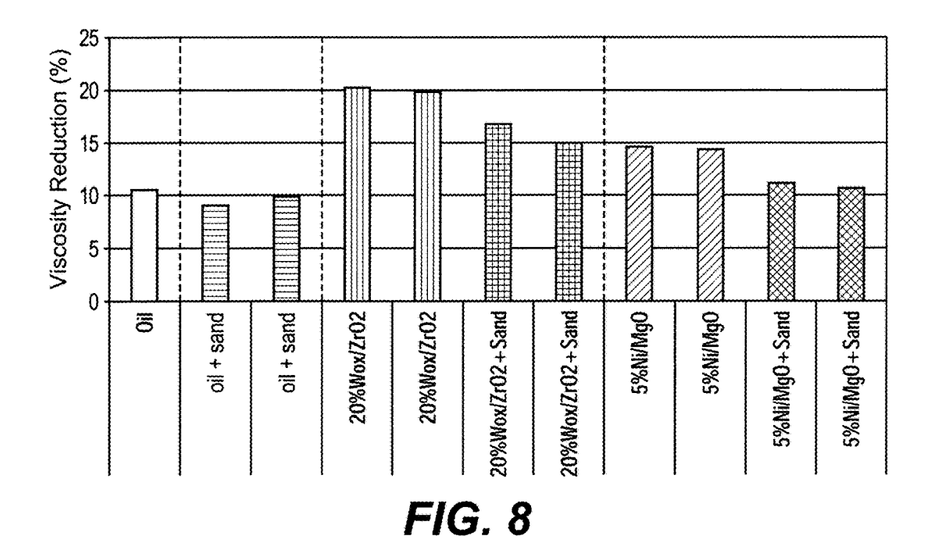
FIG. 8 demonstrates the effect of sand on oil and catalyst mixtures on viscosity reduction.

In Situ Conditions Effect of Sand. The effect of catalyst in the presence of sand was determined by mixing the crude oil and a mixture of sand and catalyst with a mass ratio of 49.8:50:0.2 and heating the mixture for 36 hours at 250° C. The viscosity and density of pre-upgrading crude oil and catalyst mixture was measured at 30° C. after centrifugation. The viscosity reduction of the upgraded oil, expressed in (viscosity before upgrading–viscosity after upgrading)/viscosity is set forth in FIG. 8 which shows that the viscosity (at 30° C.) was reduced by 7±2% due to the effect of sand with oil only and the viscosity was reduced to 15±2% for 20% $WO_x$/$ZrO_2$ catalyst when it was compared to absence of sand (which means oil with catalyst). Similarly other catalysts, such as 5% Ni—MgO, showed similar trends in the presence of sand. FIG. 8 shows that while the catalytic activity decreased in presence of sand, the viscosity of the oil was reduced.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

What is claimed is:

1. A method for decomposing an asphaltene particle, the method comprising contacting the asphaltene particle with a catalyst which comprises from about 3 to 7% Cu (by weight) and from about 15 to 25% (by weight) tungsten oxide with a zirconium oxide support and wherein the particle size of the catalyst is between from about 5 to 10 nm.

2. A method for decomposing an asphaltene particle, the method comprising contacting the asphaltene particle with a catalyst which contains 5% (by weight) Cu and 20% (by weight) tungsten oxide with a zirconium oxide support wherein the particle size of the catalyst is between from about 5 to about 10 nm.

3. A method for decomposing asphaltene in heavy oil in an underground reservoir, the method comprising:
(A) introducing into the underground reservoir a fluid comprising a catalyst selected from the group consisting of:
(i) from about 3 to about 7% Ni with a magnesium oxide support; and
(ii) from about 15 to about 25% tungsten oxide with a zirconium oxide support
or a mixture thereof; and
(B) decomposing asphaltene in the presence of the catalyst.

4. The method of claim 3, wherein the catalyst is selected from the group consisting of:
(a) 5% (by weight) Ni with a magnesium oxide support;
(b) 20% (by weight) tungsten oxide Mo with a zirconium oxide support;
(c) 5% (by weight) Ni and 5% (by weight) Mo on a magnesium oxide support; and
(d) 5% Ni (by weight) and 20% (by weight) tungsten oxide with a zirconium oxide support
and mixtures thereof.

5. The method of claim 3, wherein the fluid introduced into the underground reservoir is steam.

6. The method of claim 5, wherein the fluid introduced into the underground reservoir does not contain a hydrocarbon solvent.

7. The method of claim 5, wherein the catalyst breaks down one or more carbon/sulfur bonds, carbon/hydrogen bonds, carbon/oxygen bonds or carbon/carbon bonds in the asphaltenes.

8. The method of claim 3, wherein one or more of the following are produced from the decomposition of asphaltene in the presence of the catalyst: methyl naphthalene; 1-methyl, 4-propyl benzene; 1-methyl, 3-propyl benzene; o-cymene; 2-syn methyl, cis-decalin; 2-ethyl-1,4-dimethyl benzene; 1-methyl, 3-propyl cyclohexane; 1-methyl-2-propyl cyclopentane; 1-methyl, 3-ethyl cyclohexane; 2,3-dimethyl pentane; n-hexane; and 1-methyl, 3-ethyl cyclopentane.

9. The method of claim 8, wherein at least a portion of the asphaltenes are solubilized in methyl-naphthalene; 1-methyl, 3-propyl benzene; 1-methyl, 4-propyl benzene or o-cymene or a combination thereof.

10. A method of decreasing the viscosity of heavy oil in an underground reservoir, the method comprising:
(A) introducing into the underground reservoir a fluid comprising a catalyst selected from the group consisting of:
(i) from about 3 to about 7% Ni with a magnesium oxide support; and
(ii) from about 15 to about 25% tungsten oxide with a zirconium oxide support
or a mixture thereof; and
(i) decomposing asphaltene in the presence of the catalyst wherein the viscosity reduction of the heavy oil is greater than when asphaltene in the heavy oil is not decomposed in the presence of the catalyst.

11. The method of claim 10, wherein the catalyst is selected from the group consisting of:
(e) 5% (by weight) Ni with a magnesium oxide support;
(f) 20% (by weight) tungsten oxide Mo with a zirconium oxide support;
(g) 5% (by weight) Ni and 5% (by weight) Mo on a magnesium oxide support; and
(h) 5% Ni (by weight) and 20% (by weight) tungsten oxide with a zirconium oxide support
and mixtures thereof.

12. The method of claim 10, wherein the catalyst is introduced into the underground reservoir in steam.

13. The method of claim 12, wherein the steam introduced into the underground reservoir does not contain a hydrocarbon solvent.

14. The method of claim 13, wherein hydrocarbons are produced in the underground reservoir and wherein the asphaltene is at least partially solubilized by the produced hydrocarbons.

* * * * *